Sept. 23, 1924.  W. ST. G. ELLIOTT, JR  1,509,103

VAPOR DYNAMO ELECTRIC MACHINE

Filed Dec. 14, 1920  2 Sheets-Sheet 1

Inventor
William St. G. Elliott Jr.
By Alexander Smith
Attorneys

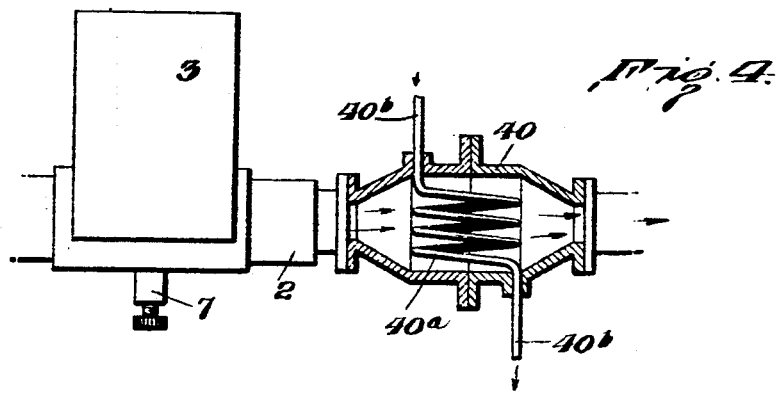
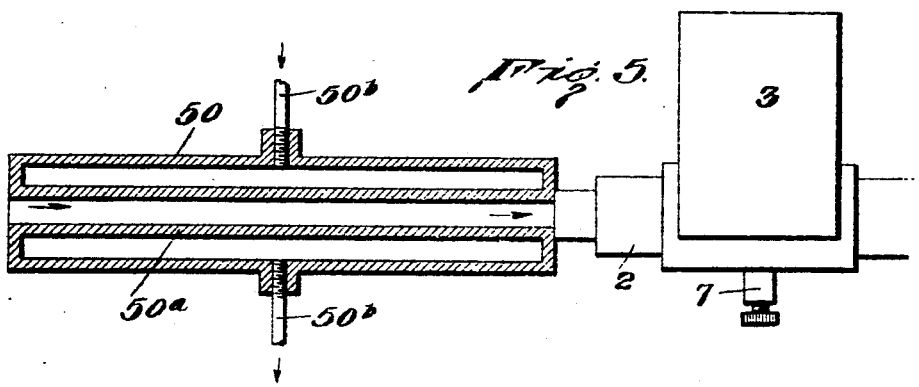
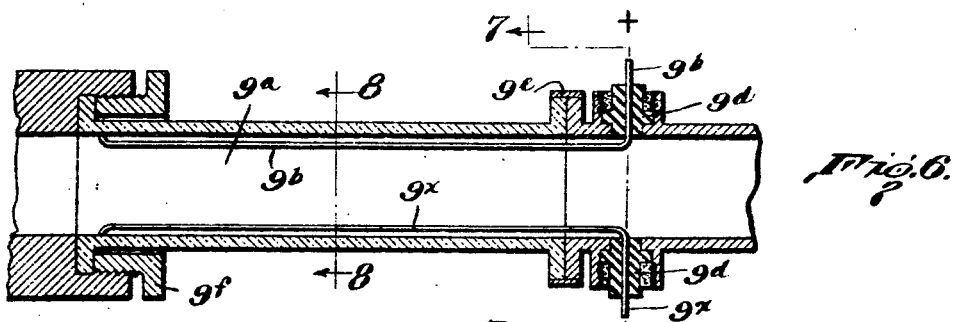
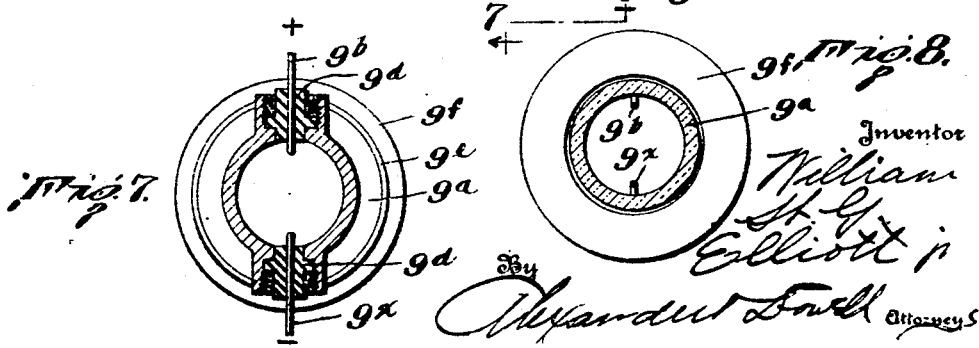

SEARCH ROOM

Patented Sept. 23, 1924.

1,509,103

UNITED STATES PATENT OFFICE.

WILLIAM ST. GEORGE ELLIOTT, JR., OF NEW YORK, N. Y.

VAPOR DYNAMO-ELECTRIC MACHINE.

Application filed December 14, 1920. Serial No. 430,667.

*To all whom it may concern:*

Be it known that I, WILLIAM ST. GEORGE ELLIOTT, Jr., a citizen of the United States, residing at New York, in the county of New York and State of New York, have invented certain new and useful Improvements in Vapor Dynamo-Electric Machines; and I hereby declare that the following is a full, clear, and exact description thereof, reference being had to the accompanying drawings, which form part of this specification.

This invention relates to dynamo electric machines, and consists in a novel apparatus wherein the energy of expanded vapor is converted directly into electric energy without the use of moving parts, such as reciprocating or turbine engines and dynamos.

In general in this invention a vapor of good conductivity, such as mercury vapor is used. This vapor is generated under pressure and expanded through a nozzle acquiring velocity and caused to traverse a passage wherein it is subjected to a strong magnetic field. While passing through this field an electric current is generated in the vapor preferably in a direction approximately at right angles to both the magnetic flow and the direction of movement of the vapor. The reaction between the magnetic field and the current traversing the vapor is such that the energy in the vapor is transformed into electricity, and the vapor escaping from the passage is practically deprived of its original excess potential and kinetic energy.

I will explain the invention with reference to the accompanying drawings which conventionally illustrate one apparatus embodying the invention and will enable those skilled in the art to understand and utilize the invention. The claims summarize the essentials of the invention, and the novel combinations therein and novel subordinate features thereof, for all of which protection is desired.

In said drawings:

Fig. 4 is an enlarged longitudinal section of the heater interposed between the electric generator and condenser.

Fig. 5 is an enlarged section of the heater interposed between the nozzle and the electric generator.

Fig. 6 is a longitudinal sectional view of a generator tube made of refractory material.

Fig. 7 is a transverse section on line 7—7 Fig. 6.

Fig. 8 is a section on line 8—8, Fig. 6.

Figure 1:
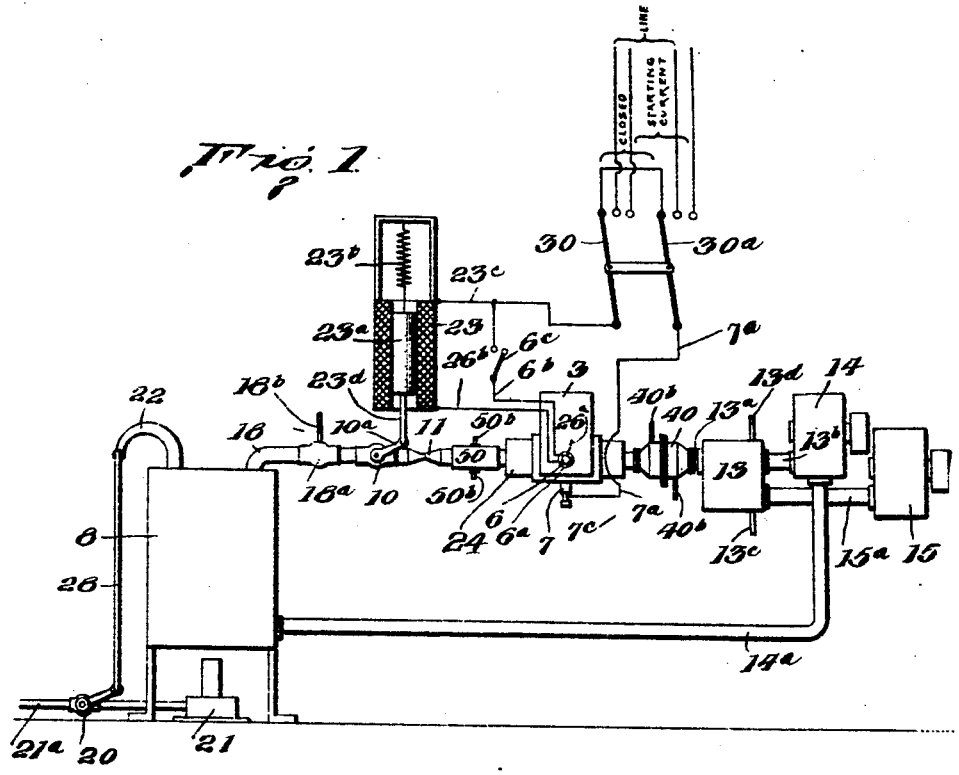
Fig. 1 illustrates diagrammatically an apparatus for carrying the invention into effect.

Referring to Fig. 1 the apparatus comprises a boiler 8 which may be of any suitable kind, adapted to retain the vapor producing liquid (preferably mercury). This boiler may be heated in any suitable way; a Bunsen burner 21 being shown, which is supplied with gas by a pipe 21ª and the supply of the gas thereto can be automatically regulated by the valve 20 in pipe 21ª, which valve is connected by means controlled by the pressure in the boiler whereby the pressure controls the amount of gas passing to the burner. As shown valve 20 is connected by a rod 28 to a Bourdon tube 22 attached to the valve, said Bourdon tube straightening out under pressure and contracting as pressure lowers and thus controls the valve, and automatically regulates the heat and pressure in the boiler.

From the boiler 8 the vapors pass through a pipe 18 provided with a controlling valve 10, to an expansion nozzle 11 through which the gases are discharged into a passage 24 in the generator wherein the vapors are subject to electrical and magnetic stresses and their energy converted into electricity as hereafter described. When a conductor crosses a magnetic field, a difference of potential is set up in the conductor at right angles to the magnetic lines and to the direction of the conductor. If the circuit is closed a current is generated. The current, conductor, and field all react against each other and this reaction is proportional to the amount of current generated. The combined action of the conductor is to tend to stop its motion. Now if the conductor be a vapor with kinetic energy only, the vapor would be more and more slowed down, the more electricity it generated and would in time if the generator tube was long enough come to a stop. As the voltage alters with the velocity it would be difficult to collect this current. I prefer to use a part of the original potential energy in the vapor to produce kinetic energy, the vapor enters the generator under pressure but moving rapidly. The expansion is continued in the generator and the potential energy used to keep up the velocity of the vapor thus insuring a fairly constant voltage throughout the length of each collector. I utilize the kinetic energy of the vapor to produce the desired vapor speed and the potential to keep this speed fairly constant. By arranging a series of generator tubes, through which the vapor goes, one after the other and by proportioning the magnetic strength the shape of expansion nozzles as well as the shape of the generator tubes it is possible to extract most of the kinetic and potential energy from the vapor. It is impossible to generate electricity without a corresponding loss of energy of some sort and in this case the energy supplied is both potential and kinetic. When a gas or vapor expands in a cylinder against a piston doing work the expansion is adiabatic and is accompanied by a certain loss of temperature. In this case the generator tube is similar to the above, as the gases do work during expansion and it is probable that a similar loss of temperature will be found to exist.

This passage 24 in the generator may be formed by opposed side members 2 of insulating material (see Figs. 2 and 3) and bottom and top members 25 and $25^a$ of conducting material. The sides 2 are shown as arranged against and between the opposed pole pieces 3 of an electro-magnet, the pole pieces may be extended above the passage by a core $3^a$ around which is wound the wire coil 4. Preferably the pole pieces are extended so as to establish a relatively long magnetic field along the length of passage 24.

The bottom member 25 may be provided with a binding post 7 and connected by a conductor $7^a$ leading to one member $30^a$ of a double pole three point switch as indicated in Fig. 1.

The opposite-member $25^a$ is connected by a wire 26 to one end of the coil 4 of the electro-magnet and the other end of the coil 4 is connected by a wire $26^a$ with a binding post 6 which may be mounted on the magnet but insulated therefrom by insulating material $6^a$, and provided with a cut out $6^c$, the object of the cut-out $6^c$ being to provide a valve so that the vapor can be shut off entirely, or that the valve can be operated by hand if desired.

Another wire $26^b$ is connected to post 6 and leads to one end of a solenoid 23 in which is a core $23^a$. The other end of the solenoid 23 is preferably connected by wire $23^c$ to one member 30 of the double pole three point switch, as indicated in Fig. 1.

The current passing through the solenoid 23 pulls the core $23^a$ downward against the action of the spring $23^b$, and the downward motion of the core $23^a$, acting through the links $10^a$ and $23^d$, shuts off the flow of the vapor by closing valve 10. If preferred the wires $7^a$ and $23^c$ could be suitably connected in any desired way to any suitable electric reception device.

A movable core $23^a$ is held in normal position in the solenoid 23 by a spring $23^b$, and is connected by a rod $23^d$ with the arm $10^a$ of the valve 10. This solenoid may be wound in series, as shown, or shunt, or compound. The position of the core $23^a$ in the solenoid is dependent on the relative pulls of the solenoid and spring, and this pull depends on the strength of the current, so that as the current overcomes the spring it causes (through the described connections) more or less closing of the valve 10 and allows less vapor to pass to the generator, thus automatically regulating the amount of vapor used according to and by the current generated. When the gas or vapor is throttled by valve 10 it reduces the quantity of vapor passing into the expansion nozzle 11, as well as the pressure, so that in the generator tube the act of throttling affects the quantity pressure and velocity of the vapor passing through.

Between the valve 10 and the generator 24 is preferably placed an expansion nozzle 11 (see Fig. 1). In this nozzle a large part of the potential energy in the vapor is turned into kinetic.

Figures 2, 3:
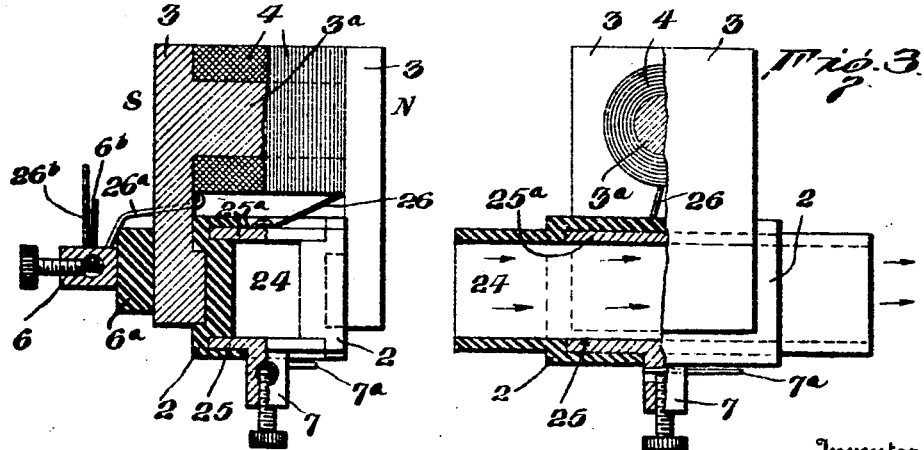
Fig. 2 is an enlarged partial end view and partial transverse section through the "generator," or that portion of the apparatus wherein the electricity is generated in the vapor.
Fig. 3 is a partial side view and partial longitudinal section through Fig. 2.

The vapor after traversing the passage 24 in the generator passes by pipe $13^a$ into a condenser 13, which may be of any suitable construction and may be supplied with cooling water through the pipes $13^c$ and $13^d$. Connected to the condenser by the pipe $13^b$ is the force feed pump 14, of any suitable construction, which forces the condensed vapor back into the boiler 8 through the pipe $14^a$. The condenser may also be connected by pipe $15^a$ to an air pump 15 of any suitable construction, which is used to keep air out of the apparatus and enable a higher vacuum to be maintained. The air pump, return feed pump, the condenser and other parts are merely shown conventionally as I do not claim anything novel per se but the electric generator or converting device (Figs. 1, 2, 3) is essentially novel and, as shown in Figs. 2 and 3, in this generator the vapors are led through a magnetic field, while the current traverses this field approximately at right angles to both the vapor current and magnetic flow.

Preferably a steam generator or water heater 40 is placed between the generator and the condenser (see Figs. 1 and 4). This heater is preferably cylindric and comprises a tubular casing traversed by the hot gases leaving the generator, and within this casing is a coil $40^a$ through which water or steam can be circulated by pipes 40<sup>b</sup> and heated by the gases passing therearound and through the casing. The steam generated could be used for heating the material to be vaporized, generating steam to be used in another generator, or in a turbine or engine, or for any other purpose for which it could be usefully employed.

If desired another heater 50 could be placed between the expansion nozzle 11 and the generator (as shown in Figs. 1 and 5). This heater comprises a cylindrical casing having an internal pipe 50<sup>a</sup> through which the gases are passed from the nozzle to the generator. The space between the pipe 50<sup>a</sup> and casing forms a liquid heating space through which a liquid can be circulated by pipes 50<sup>b</sup>, and this hot liquid can be utilized for heating the liquid to be vaporized in boiler and vapor generator or for any other purpose desired. This heater 50 extracts heat from the moving vapors without materially affecting their velocity and without affecting the generation of electricity therefrom.

Obviously the invention is not restricted to any particular form of construction of either heater 40 or 50. In very small apparatus these heaters might be omitted. In large apparatus they would be useful.

In Figs. 6–8 I show a generator tube 9<sup>a</sup> cylindrical in cross section and which may be made of fused felspar, porcelain, or glass. Conductors 9<sup>x</sup>, 9<sup>b</sup> enter the tube through the insulators 9<sup>d</sup> and extend along diametrically opposite sides of the tube and act as the conductors 25 and 25<sup>a</sup>. These conductors 9<sup>b</sup> and 9<sup>x</sup> may be supported in the tube in any suitable way. That portion of the conductor not under the influence of magnetic lines of force may be covered with an electric insulator such as enamel. Mercury vapor while in motion is polarized in the direction of motion. This polarizing is dependent on the motion and is approximately proportional to the velocity. It acts in this machine to keep the resistance of vapor to electric current less while crossing the machine than when going with or against vapor. In other words it is easier for the current generated to go from one side of generator tube to the other side instead of going astray in the vapor. By extending the magnetic influence longitudinally beyond the conductors most of the current will be collected.

Where mercury or a similar expensive substance is used it is necessary to insure against leakage as far as possible. To do this I preferably weld all joints. In Fig. 6 a platinum ring 9<sup>e</sup> is fused to the tube 9<sup>a</sup>, the other end being welded to the metal.

If water vapor is used I preferably mix with it a substance such as an acid which increases its conductivity. This may be done by having the vapor traverse a mixer indicated at 18<sup>a</sup>, Fig. 1, supplied with acid by pipe 18<sup>b</sup>. While water vapor may be used I prefer to use an element as such would not be subject to disassociation. Any element which would be liquid at low temperature could be used, such as mercury.

In small machines the residual magnetism will be strong enough to cause generation of electric current if a closed circuit is formed.

When it is desired to generate an alternating current the field magnets are made with laminated pole pieces and an alternating current is supplied to the field coils. A wavelike direct current can be generated by supplying such a current to the field. This machine can also supply a wave like direct current when the field is supplied by an alternating current by incorporating a starting device such as is used in mercury rectifiers and covering one of the poles with mercury. In this case the tube would have to be cooled if high pressure mercury vapor was used. Owing to the facility with which an alternating current can be stepped up or down in voltage, large machines of this type would be made alternating. It would be much easier to get a desired high voltage by this means than by a large number of machines as here described in series.

*Operation.*

The vapor under pressure leaves the boiler 8 and traverses pipe 18 to nozzle 11 from which it issues with great velocity into the passage 24 wherein the remaining potential energy as well as the kinetic is turned into electric energy. This generator makes use of the well known and universally accepted principle that a conductor conveying a current is not urged along lines of magnetic force, but in a direction that is at right angles to them, and at the same time at right angles to its own length. If the conductor were vertical and current entered at its lower end an N pole placed directly in front of it or an S pole directly behind it would urge it to the right; with the poles reversed the conductor would be urged to the left.

The expanded vapor moves in the direction indicated by the arrows in Fig. 3. The electric current enters the bottom conductor 25 and is conducted by the vapor molecules across the passage 24 to the opposite conductor 25<sup>a</sup>. Assuming the N pole is to the right, Fig. 2, and nearest the observer, Fig. 3. by the above law the vapor will cut the lines of magnetic force and be subjected to forces tending to stop it, and its momentum will be turned into electric energy. The physical action is similar to that in a dynamo, wherein the generation of the current tends to stop the rotation of the armature; and this analogy is especially evident where potential energy is used to keep the vapor current constant. In this invention the potential energy is turned directly into electricity.

I prefer to construct the machine so that both the potential and kinetic energy of the vapor will be converted into electricity. To get the most out of the vapor it is essential to use a high vacuum, as the vapor is then expanded and enters the generator under greater velocity and pressure than in the condenser, and the potential energy remaining is utilized in the generator to keep the vapors moving at a velocity as nearly constant as possible.

In a machine of this kind the electromotive force is mainly governed by the velocity of the vapor and the resistance of the circuit; and the current by the volume of the vapor traversing the tube. The mechanical essential in such a machine is a passage extending through a magnetic field, so that the vapors in traversing said passage will cut the lines of magnetic force; said tube being of a material not acted on chemically by the vapor or magnetic flow, and having means for collecting and distributing the electricity.

In very large plants it would be preferable to use potassium, which has a boiling point of 1000° F., to generate the mercury vapors which boil at 600° F., which in turn would generate steam in the heaters. In each case the vapor first goes through the generator and heater or heaters before going into the condenser. In this manner the waste heat would be used to generate vapor to be used in the next generator. That is, the heater, Fig. 4, becomes a boiler for the next series. From a thermodynamic standpoint it seems probable that the vapor in passing through the generator would be cooled as much as if the expansion took place in a closed cylinder of a reciprocating engine.

Where water is used a certain proportion of the vapor would be disassociated by electrolytic action. The resultant $H^2$ and O would not only consume energy but would interfere with the vacuum; they could be partly utilized by collecting and burning same where it would do the most good.

In small machines there is enough residual magnetism to get the machine going by making the circuit. For larger machines a permanent magnet would be placed alongside the field magnets. For still larger outfits a source of external current would be used, all of which methods are provided for in the switch.

While I have shown a single magnet and electric circuit, such an appliance is only adapted to small installations. In large installations a number of generators could be arranged in line, each generator collecting only a part of the energy in the vapor, and these generators could be connected electrically in any of the usual ways, viz: series or parallel or in combination of the two.

The whole apparatus is insulated from outside electrical influences.

What I claim is:

1. The herein described method of producing electricity from heat, which consists in generating a vapor in a closed circuit by the external application of heat to a portion of the circuit; passing the vapor so generated through a magnetic field, where a difference of potential in the vapor is obtained and utilized to form a useful current; and then cooling the vapor into a liquid form and returning it to the heated portion of circuit to be used over again.

2. The herein described apparatus for producing electricity from heat; comprising a closed circuit for vapors; means for the application of heat to a portion of the circuit to produce a vapor from a liquid therein; means for producing a magnetic field at another portion of the circuit whereby difference of potential is produced in the vapor as it passes through such field, resulting in the generation of an electric current; and means for cooling another portion of the circuit to reduce the vapors into a liquid form, such liquid being returned to the heated portion of circuit to be used over again; and means for collecting the generated electric current.

3. In an apparatus as set forth in claim 2 having a portion of the circuit heated to generate vapor under considerable pressure, a nozzle adapted to convert a portion of the pressure into velocity, and generating tubes or nozzles adapted to utilize the energy in the gases and turn them into useful electric current.

4. In an apparatus as set forth in claim 2, means for automatically controlling the amount of vapor supplied to the passage, according to the potential difference of the aforesaid conductors.

5. In apparatus as set forth in claim 2, means for automatically controlling the pressure of vapor, according to the potential difference of the aforesaid conductors.

6. In apparatus as set forth in claim 2, means for automatically controlling the velocity of vapor, according to the potential difference of the aforesaid conductors.

7. In an apparatus adapted to generate electricity from moving vapors; a circuit for the vapor; a tube in said circuit traversing a magnetic field and adapted to generate electricity in the vapors; means for collecting said electricity; a device for regulating the flow of said vapors to said generating tube; and a device for regulating the pressure of vapor delivered to said flow regulating device.

8. In apparatus for generating electric current from vapor; a generator containing a passage through which the vapor is directed; electrical conductors of different polarity at opposite sides of said passage, means for establishing a powerful magnetic field across said passage, means for generating vapors and forcing them through the passage; and means for condensing the vapors and returning them to the source of generation.

9. In apparatus for generating electric current from vapor; a generator containing a passage through which the vapor is directed; electrical conductors of different polarity at opposite sides of said passage, means for establishing a powerful magnetic field across said passage, and means for automatically controlling the amount of vapors supplied to the passage according to the generation of current therein.

10. In apparatus for generating electric current from vapor; a generator containing a passage through which the vapor is directed; electrical conductors of different polarity at opposite sides of said passage, means for establishing a powerful magnetic field across said passage; means for generating vapors and forcing them through said passage; means for condensing the vapors and returning them to the source of generation; and means for automatically controlling the amount of vapors supplied to the passage according to the generation of current therein.

11. In apparatus for generating electricity from heat, whereby vapors are generated under pressure by the external application of heat to a portion of a closed circuit; a condenser in the circuit; means for returning the condensed liquid to the vapor generator; and an electric generator placed between the vaporizer and condenser in the circuit wherein the motion of the vapor past a magnetic field is produced by the difference of pressures in the vaporizer and condenser; the motion of the vapor in the generator causing a potential difference in diverse sections of the generator in the vapor; with means for collecting the current caused by the potential difference set up.

12. In apparatus for generating electricity in moving vapors, a passage through which the vapor is directed, electric conductors of different polarity at opposite sides of said passage, means for generating vapors and forcing them through the passage. means for establishing a magnetic field across said passage, and means for condensing the vapors and returning them to the source of vapor generation.

In testimony that I claim the foregoing as my own, I affix my signature.

WILLIAM ST. GEORGE ELLIOTT, Jr.